(12) United States Patent
Namba et al.

(10) Patent No.: US 10,484,566 B2
(45) Date of Patent: Nov. 19, 2019

(54) LIGHT SCANNING APPARATUS, HOUSING, AND IMAGE FORMING APPARATUS

(71) Applicant: CANON KABUSHIKI KAISHA, Tokyo (JP)

(72) Inventors: Hisashi Namba, Utsunomiya (JP); Masahiro Ogura, Saitama (JP); Yosuke Murakami, Utsunomiya (JP); Ken Katsuta, Saitama (JP); Yuta Okada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/891,087

(22) Filed: Feb. 7, 2018

(65) Prior Publication Data
US 2018/0234575 A1    Aug. 16, 2018

(30) Foreign Application Priority Data

Feb. 15, 2017    (JP) .................................. 2017-025993

(51) Int. Cl.
| | |
|---|---|
| H04N 1/028 | (2006.01) |
| G02B 27/09 | (2006.01) |
| H04N 1/113 | (2006.01) |
| H04N 1/00 | (2006.01) |
| G02B 26/12 | (2006.01) |

(52) U.S. Cl.
CPC ....... *H04N 1/02815* (2013.01); *G02B 26/123* (2013.01); *G02B 26/125* (2013.01); *G02B 27/0977* (2013.01); *H04N 1/00519* (2013.01); *H04N 1/113* (2013.01)

(58) Field of Classification Search
None
See application file for complete search history.

(56) References Cited

U.S. PATENT DOCUMENTS

| | | | |
|---|---|---|---|
| 7,072,087 B2 | 7/2006 | Nakahata | 359/204.1 |
| 7,298,390 B2 | 11/2007 | Nakahata | 347/231 |
| 7,522,326 B1 | 4/2009 | Otoguro | 347/256 |

(Continued)

FOREIGN PATENT DOCUMENTS

JP    H11-64773    3/1999

OTHER PUBLICATIONS

U.S. Appl. No. 15/702,219, filed Sep. 12, 2017.
(Continued)

*Primary Examiner* — Frantz Bataille
(74) *Attorney, Agent, or Firm* — Venable LLP

(57) ABSTRACT

A light scanning apparatus including: a rotary polygon mirror configured to deflect a laser beam emitted from a light source; optical elements configured to guide the laser beam to a photosensitive member; a housing having a bottom surface and a side wall portion standing from the bottom surface and intersecting with a longitudinal direction of the optical elements; and a plurality of wall portions provided on the bottom surface so as to intersect with the longitudinal direction between the bottom surface and a lens of the optical elements that is closest to the rotary polygon mirror, the plurality of wall portions forming an air flow path for guiding an air flow caused by rotation of the rotary polygon mirror from a first space in which the rotary polygon mirror is arranged to a second space opposite to the first space with respect to the lens.

20 Claims, 8 Drawing Sheets

(56) References Cited

U.S. PATENT DOCUMENTS

| | | | |
|---|---|---|---|
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2005/0062836 A1* | 3/2005 | Nakajima | G03G 15/011 347/225 |
| 2009/0244670 A1 | 10/2009 | Sato et al. | 359/205.1 |
| 2012/0081770 A1 | 4/2012 | Sato et al. | 359/204.1 |
| 2013/0286145 A1* | 10/2013 | Mamiya | G02B 26/127 347/224 |
| 2016/0216632 A1* | 7/2016 | Ishidate | G03G 15/043 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

LIGHT SCANNING APPARATUS, HOUSING, AND IMAGE FORMING APPARATUS

BACKGROUND OF THE INVENTION

Field of the Invention

The present invention relates to a light scanning apparatus to be used in an image forming apparatus, for example, a copying machine, a printer, a facsimile machine, or a multifunction peripheral having those functions, a housing of the light scanning apparatus, and an image forming apparatus including the light scanning apparatus.

Description of the Related Art

As a light scanning apparatus to be used in an electrophotographic image forming apparatus, a light scanning apparatus having the following configuration has been known. That is, the light scanning apparatus forms a latent image on a photosensitive member in such a manner that a rotary polygon mirror deflects a light beam emitted from a light source, and an optical component such as a lens and a mirror guides the deflected light beam onto a photosensitive surface of the photosensitive member. A deflector includes a rotary polygon mirror having a plurality of reflecting surfaces, and a motor, which is a drive portion configured to rotate the rotary polygon mirror at high speed. When the deflector performs scanning with a laser beam continuously for a long period of time, the deflector is increased in temperature with heat from the motor. When the rotary polygon mirror rotates at high speed and the deflector has a high temperature, high-temperature air around the deflector flows out to the surroundings.

A scanning optical system including mirrors and lenses configured to form an image of the laser beam scanned by the rotary polygon mirror is generally long in a scanning direction. For the purpose of mounting the scanning optical system compactly in a housing of a light scanning apparatus, the scanning optical system is arranged in the vicinity of the deflector. As a result, the scanning optical system is arranged to block a flow of the high-temperature air, and the scanning optical system may become an obstruction. In such case, it becomes difficult for the high-temperature air from the deflector to flow in a direction orthogonal to a longitudinal direction of the scanning optical system. In that case, the flow of the high-temperature air from the deflector flows in a direction parallel to the longitudinal direction of the scanning optical system to impinge on side walls of the housing of the light scanning apparatus once, and then flows along the side walls to be distributed across the entire housing. Therefore, the high-temperature air from the deflector first impinges on the side walls of the housing or support portions supporting the scanning optical system at both ends to increase temperatures of the side walls or the support portions of the scanning optical system close to the side walls. When the temperatures of the side walls of the housing are increased, the housing is warped. When the temperatures of the support portions of the scanning optical system including the mirrors and the lenses are increased, the scanning optical system including the mirrors and the lenses is changed in attitude. In other words, with the scanning optical system being arranged in the vicinity of the deflector, the temperatures of the side walls of the housing or the support portions of the scanning optical system are increased, and a position irradiated with the laser beam is changed significantly with the increases in temperature. In an image forming apparatus in which four colors are integrated, in particular, positions irradiated with laser beams of the respective colors may be changed separately to cause color misregistration.

In order to address the above-mentioned problem, there has been disclosed a configuration in which a gap is formed between a lens of the scanning optical system in the vicinity of the deflector and a bottom surface of the housing of the light scanning apparatus to allow the high-temperature air from the deflector to flow to the scanning optical system side (Japanese Patent Application Laid-Open No. H11-064773).

Even when the high-temperature air from the deflector is allowed to flow to the scanning optical system side, the high-temperature air flowing out of the deflector has a strong component in a rotational direction of the rotary polygon mirror, and hence flows toward the side walls of the housing in the rotational direction of the rotary polygon mirror. Then, a side wall on one side of the housing and support portions of an optical element arranged in the vicinity of the side wall are increased in temperature, and positions irradiated with the laser beams are changed significantly with the increases in temperature.

SUMMARY OF THE INVENTION

The present invention has been made in view of the above-mentioned circumstances, and therefore has an object to reduce a change in position irradiated with a laser beam caused by heat generation in a deflector.

According to one embodiment of the present invention, there is provided a light scanning apparatus comprising:
a light source configured to emit a laser beam;
a rotary polygon mirror configured to deflect the laser beam emitted from the light source;
a plurality of optical elements configured to guide, to a photosensitive member, the laser beam deflected by the rotary polygon mirror;
a housing having a bottom surface and a plurality of side wall portions standing from the bottom surface, the light source being mounted on a side wall portion, of the plurality of side wall portions, intersecting with a longitudinal direction of the plurality of optical elements, the rotary polygon mirror being mounted on the bottom surface; and
a plurality of wall portions provided on the bottom surface so as to intersect with the longitudinal direction between the bottom surface and a lens, of the plurality of optical elements, that is closest to the rotary polygon mirror on an optical path of the laser beam deflected by the rotary polygon mirror, and the plurality of wall portions forming an air flow path for guiding an air flow caused by rotation of the rotary polygon mirror from a first space in which the rotary polygon mirror is arranged to a second space that is opposite to the first space with respect to the lens.

Further features of the present invention will become apparent from the following description of exemplary embodiments with reference to the attached drawings.

DESCRIPTION OF THE EMBODIMENTS

Now, modes for carrying out the present invention are described in detail by way of embodiments with reference to the drawings. In the following description, a rotational axis direction of a rotary polygon mirror 1, which is to be described later, is defined as a "Z axis direction", a longitudinal direction of optical elements is defined as a "Y axis direction", and a direction orthogonal to the Y axis and the Z axis is defined as an "X axis direction". At this time, rotational direction of the rotary polygon mirror may be parallel to the X axis direction or the Y axis direction. A direction in which a laser beam is scanned by the rotary polygon mirror 1 is defined as a "main scanning direction", and a direction orthogonal to the main scanning direction is defined as a "sub-scanning direction". In this case, the main scanning direction may be parallel to the X axis or the Y axis, and the sub-scanning direction may be parallel to the X axis or the Z axis. Moreover, the optical elements have the longitudinal direction in the main scanning direction, and a direction orthogonal to the longitudinal direction of the optical elements is the sub-scanning direction.

First Embodiment

[Configuration of Image Forming Apparatus]

Figure 1:
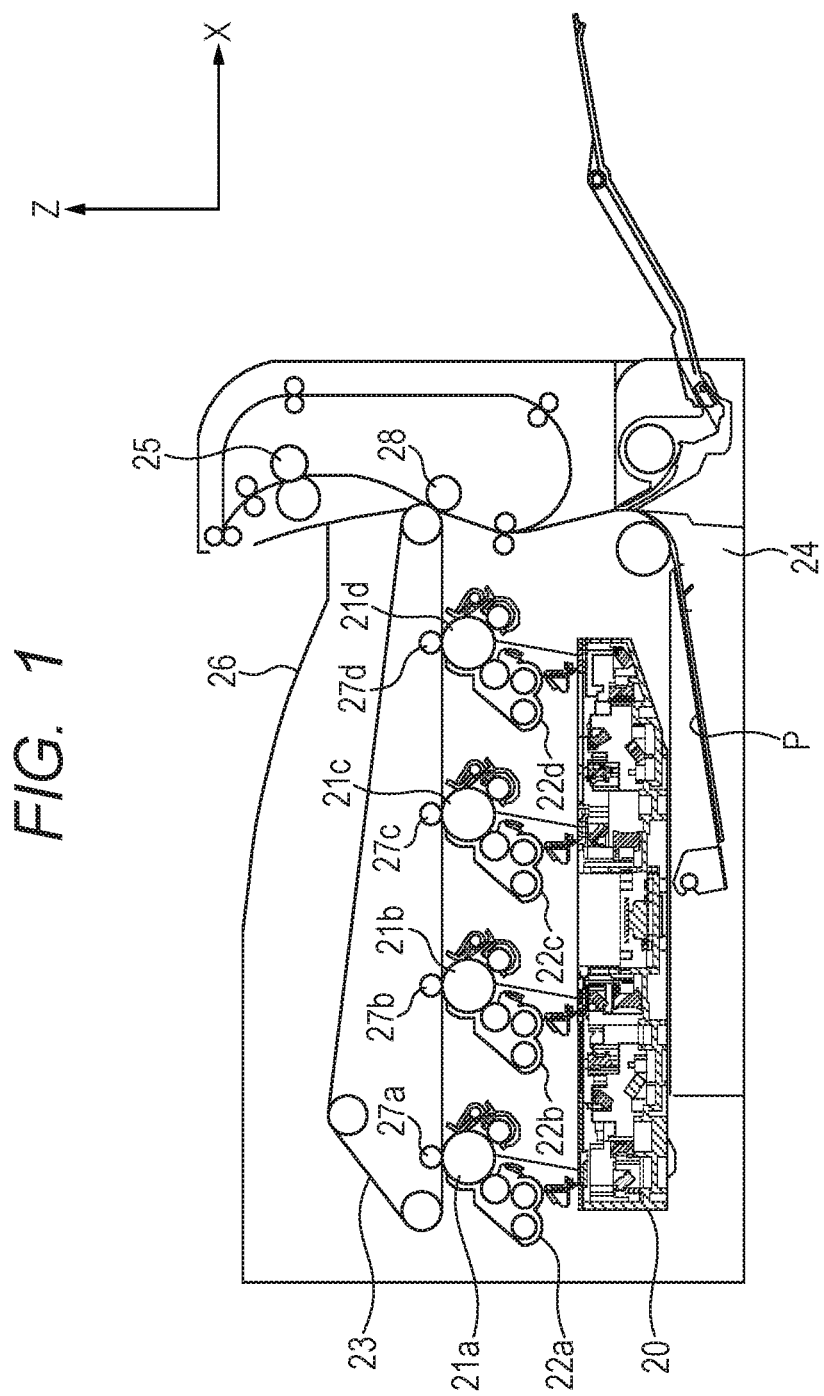
FIG. 1 is a schematic view of an image forming apparatus according to a first embodiment of the present invention.
Figure 2:
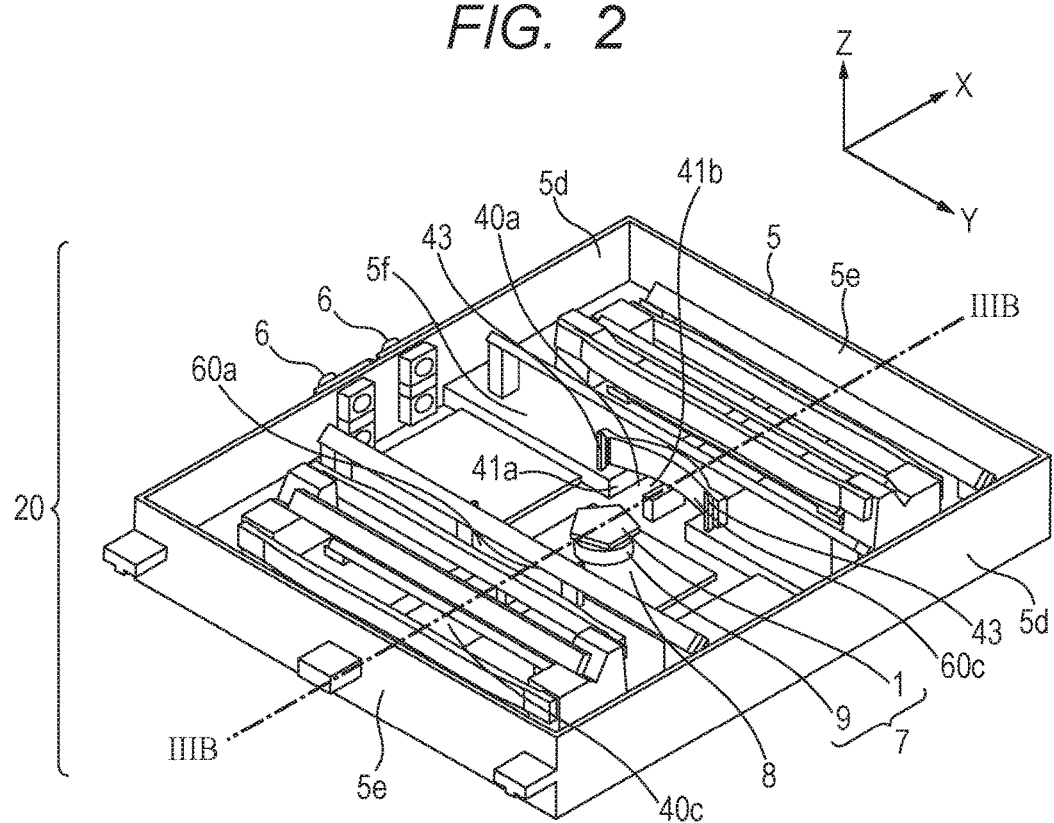
FIG. 2 is a perspective view of a light scanning apparatus according to the first embodiment.

FIG. 1 is a cross-sectional view of a configuration of an image forming apparatus, which is a color printer of a tandem type and in which a light scanning apparatus 20 is mounted, according to a first embodiment of the present invention. FIG. 2 is a perspective view of the entire light scanning apparatus 20 according to the first embodiment. As illustrated in FIG. 1, the image forming apparatus according to the first embodiment adopts a method of exposing photosensitive members from below (−Z direction side of) an image forming portion. The light scanning apparatus 20 irradiates photosensitive drums 21a, 21b, 21c, and 21d, which are photosensitive members arranged above the light scanning apparatus 20, with a laser beam. In the image forming apparatus according to the first embodiment, four photosensitive drums 21a to 21d are exposed to light by one light scanning apparatus 20. The photosensitive drum 21a corresponds to yellow, the photosensitive drum 21b corresponds to magenta, the photosensitive drum 21c corresponds to cyan, and the photosensitive drum 21d corresponds to black. In the following description, suffixes a to d indicating the colors are omitted except when required. When an electrostatic latent image is formed on the photosensitive drum 21 through the exposure to light by the light scanning apparatus 20, the electrostatic latent image on the photosensitive drum 21 is developed by a developing device 22. A toner image formed on the photosensitive drum 21 through the development is transferred onto an intermediate transfer belt 23, which is a transfer-receiving member, by primary transfer rollers 27a to 27d, which serve as transfer members. The toner image on the intermediate transfer belt 23 is transferred by a secondary transfer roller 28 onto a recording sheet P conveyed from a cassette 24. The recording sheet P having the toner image transferred thereon has the toner image fixed thereon by a fixing device 25, and is discharged to a discharge tray 26 outside the apparatus.

[Configuration of Light Scanning Apparatus]

Figure 3A:
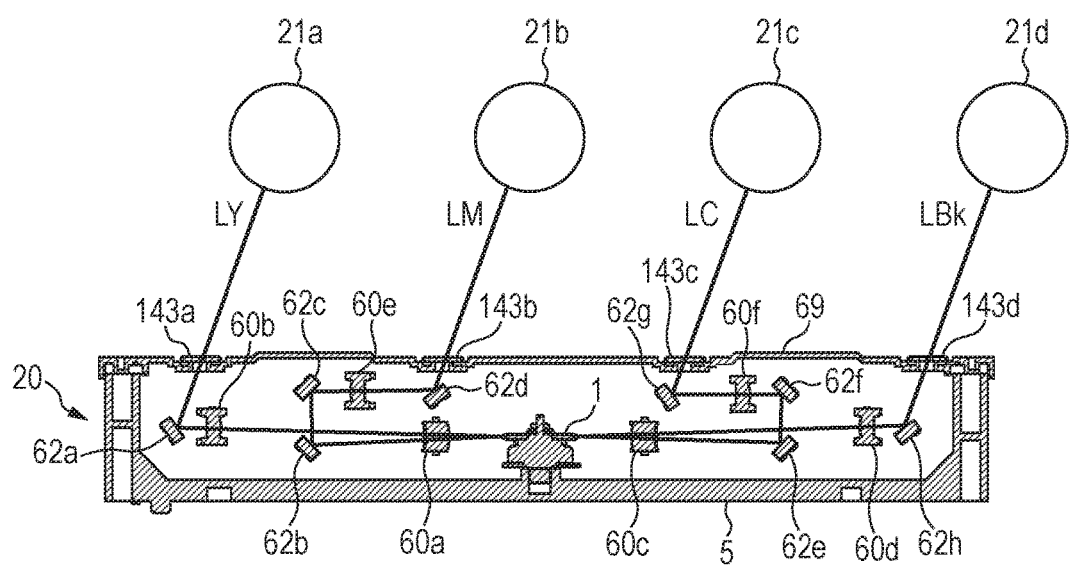
FIG. 3A is a cross-sectional view of the light scanning apparatus according to the first embodiment.

FIG. 2 is a perspective view for illustrating the inside of the light scanning apparatus 20 according to the first embodiment. A housing 5 has a bottom surface 5f and a plurality of side wall portions 5d and 5e standing from the bottom surface 5f. In this case, the bottom surface 5f of the housing 5 has formed thereon ribs or other portions for increasing rigidity of the housing 5, and is not a flat surface. Moreover, the side wall portions 5d of the housing 5 refer to two side wall portions in a direction orthogonal to the longitudinal direction of the optical elements, which are to be described later, and the side wall portions 5e of the housing 5 refer to two side wall portions that are parallel to the longitudinal direction of the optical elements, which will be described later. The housing 5 has a light source 6 mounted to, of the plurality of side wall portions 5d and 5e, one side wall portion 5d of the two side wall portions 5d that are orthogonal to the longitudinal direction of the optical elements, and the rotary polygon mirror 1 mounted to the bottom surface 5f. In the light scanning apparatus 20 illustrated in FIG. 2, a deflector 7, which is configured to deflect and scan the laser beam emitted from the light source 6 based on an image signal, is arranged in a center portion (installation area 42 of FIG. 4, which is to be described later), which is a first space, of the bottom surface 5f of the housing 5. The deflector 7 includes the rotary polygon mirror 1 and a drive portion 9 configured to drive the rotary polygon mirror 1 to rotate. The deflector 7 is mounted on a circuit board 8 configured to control the drive portion 9. Moreover, at a position opposed to the rotary polygon mirror 1, a scanning optical system, which is configured to form an image of the laser beam on the photosensitive drum and perform constant-speed scanning, is arranged. In the housing 5, optical lenses 60a to 60f and reflection mirrors 62a to 62h, which are a plurality of optical elements, are arranged as the scanning optical system. In FIG. 2, reference symbols are attached to the optical lenses 60a and 60c, and reference symbols of other optical elements are omitted. Optical paths of laser beams of the respective colors are described with reference to a cross-sectional view of the light scanning apparatus 20 of FIG. 3A.

A laser beam LY, which is emitted from the light source 6 to correspond to the photosensitive drum 21a, is deflected by the rotary polygon mirror 1 and enters the optical lens 60a. The laser beam LY passes through the optical lens 60a, and enters the optical lens 60b. After passing through the optical lens 60b, the laser beam LY is reflected by the reflection mirror 62a. The laser beam LY reflected by the reflection mirror 62a passes through a transparent window 143a, and scans the photosensitive drum 21a.

A laser beam LM, which is emitted from the light source 6 to correspond to the photosensitive drum 21b, is deflected by the rotary polygon mirror 1 and enters the optical lens 60a. The laser beam LM passes through the optical lens 60a, is reflected by the reflection mirror 62b and the reflection mirror 62c, and enters the optical lens 60e. After passing through the optical lens 60e, the laser beam LM is reflected by the reflection mirror 62d. The laser beam LM reflected by the reflection mirror 62d passes through a transparent window 143b, and scans the photosensitive drum 21b.

A laser beam LC, which is emitted from the light source 6 to correspond to the photosensitive drum 21c, is deflected by the rotary polygon mirror 1, and enters the optical lens 60c. The laser beam LC passes through the optical lens 60c, is reflected by the reflection mirror 62e and the reflection mirror 62f, and enters the optical lens 60f. The laser beam LC passes through the optical lens 60f, and is reflected by the reflection mirror 62g. The laser beam LC reflected by the reflection mirror 62g passes through a transparent window 143c, and scans the photosensitive drum 21c.

A laser beam LBk, which is emitted from the light source 6 to correspond to the photosensitive drum 21d, is deflected by the rotary polygon mirror 1 and enters the optical lens 60c. The laser beam LBk passes through the optical lens 60c, and enters the optical lens 60d. After passing through the optical lens 60d, the laser beam LBk is reflected by the reflection mirror 62h. The laser beam LBk reflected by the reflection mirror 62h passes through a transparent window 143d, and scans the photosensitive drum 21d. In the following description, the optical lenses 60a to 60f are collectively referred to as the "optical lenses 60", and the reflection mirrors 62a to 62h are collectively referred to as the "reflection mirrors 62". The plurality of optical elements of the scanning optical system are long, and support members (denoted by 43 in FIG. 4) configured to support each optical element are arranged at least at both ends of the optical element (one end and the other end of the optical element). The support members are two support portions that are formed integrally with the housing 5 to support the one end and the other end of the optical element.

[Flow Path (Air Flow Path for Guiding Air Flow Generated by Rotary Polygon Mirror)]

The rotary polygon mirror 1 is rotated at high speed, and hence air around the deflector 7 is rotated around the rotary polygon mirror 1 at high speed. Therefore, high-temperature air spreads from the deflector 7 to the surroundings due to the centrifugal force. In the first embodiment, the housing 5 has a flow path 40a for causing the high-temperature air from the deflector 7 to flow in the sub-scanning direction orthogonal to the main scanning direction (Y direction). Another flow path is formed on the side opposite to the flow path 40a with respect to the rotary polygon mirror 1, and is referred to as a "flow path 40c". The flow path 40c is formed on the side opposite to the flow path 40a with the rotary polygon mirror 1 being the center in the sub-scanning direction. Each of the flow paths 40a and 40c is hereinafter sometimes referred to as the "flow path 40". A flow of the air generated with the rotation of the rotary polygon mirror 1 flows into the flow path 40. The flow path 40 has two wall portions (walls 41a, which are to be described later) standing from the bottom surface 5f of the housing 5 in the direction intersecting with a first optical element (optical lens 60a, 60c) supported by support portions (support members 43, which are to be described later) of the optical element. The wall portions 41a are formed on the bottom surface 5f between, of the plurality of optical elements, the optical lens 60c that is closest to the rotary polygon mirror 1 on the optical path of the laser beam deflected by the rotary polygon mirror 1 and the bottom surface 5f so as to intersect with the longitudinal direction of the optical lens 60c. The wall portions 41a form an air flow path for guiding, from a space in which the rotary polygon mirror 1 is arranged to a space that is opposite to the space in which the rotary polygon mirror 1 is arranged with respect to the optical lens 60c, an air flow generated by the rotation of the rotary polygon mirror 1.

The flow path 40 is formed by the two walls 41a. Alternatively, there may be adopted a configuration in which a plurality of wall portions are formed on the bottom surface 5f of the housing 5 in the direction intersecting with the longitudinal direction of the optical elements. In this case, the flow of the air generated by the rotation of the rotary polygon mirror 1 is caused to flow among and along the plurality of wall portions.

When the flow path 40 is not present, the optical lenses 60a and 60c become obstructions in the sub-scanning direction (X axis direction) in which the scanning optical system is arranged, and hence it becomes difficult for the high-temperature air from the deflector 7 to flow in the sub-scanning direction. In that case, the high-temperature air from the deflector 7 flows in the main scanning direction (Y axis direction) to impinge on the side wall portions 5d of the housing 5 once, and then flows along the side wall portions 5d to be distributed across the entire housing 5. The side wall portions 5d are side wall portions that are substantially orthogonal to the main scanning direction.

Therefore, the side wall portions 5d of the housing 5, on which the high-temperature air from the deflector 7 impinges first, are increased in temperature. When the temperatures of the side wall portions 5d of the housing 5 are increased, the housing 5 is warped to change attitude of the optical lenses 60 and the reflection mirrors 62, which are the optical elements. Moreover, the support members of the optical elements that are close to the side wall portions 5d of the housing 5 are also increased in temperature, with the result that the support portions of the reflection mirrors 62 and the optical lenses 60 of the scanning optical system are locally deformed to change attitude of the reflection mirrors 62 and the optical lenses 60. In an image forming apparatus in which four colors are integrated, in particular, changes in position of the laser beams of the respective colors may cause color misregistration.

Figure 4:
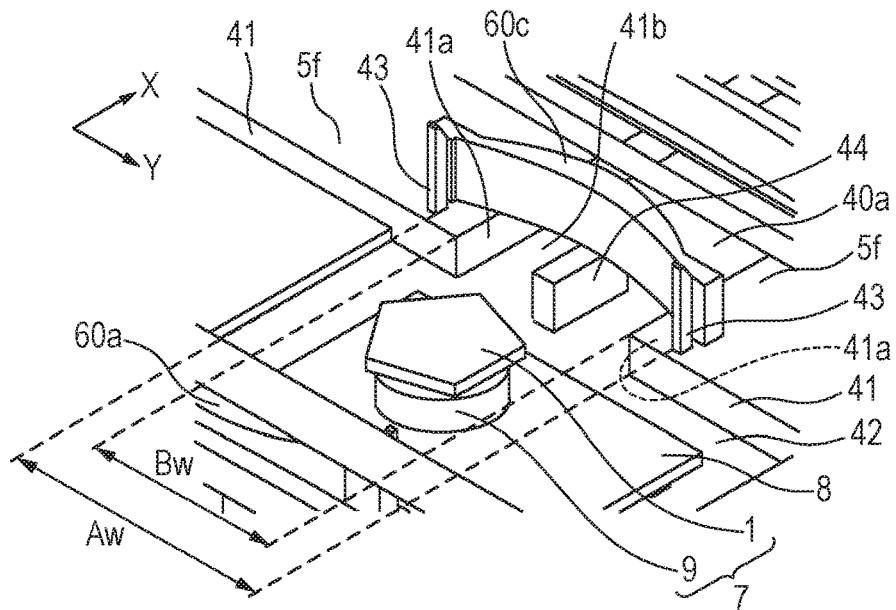
FIG. 4 is a perspective view for illustrating a main part around a rotary polygon mirror in the first embodiment.

FIG. 4 is an enlarged view of the vicinity of the deflector 7 in the first embodiment. Each of the optical lenses 60a and 60c is supported by the support members 43 at the both ends thereof. The support members 43 are formed integrally with the housing 5. Further, a center portion of the optical lenses 60 is also supported by a support member, and each of the optical lenses 60a and 60c is supported at three points: the both ends and the center portion. In FIG. 4, the support members 43 at the both ends of the optical lens 60c and a support member 44 at the center portion are illustrated. The flow path 40 is formed by a groove 41b (groove portion) formed in the bottom surface 5f of the housing 5 between the support members 43 at the both ends of the optical lens 60, and the walls 41a.

Of members opposed to the deflector 7, the first members to be opposed to the deflector 7 in the main scanning direction are the side wall portions 5d. An area of the bottom surface 5f of the housing 5 from the deflector 7 to the side wall portions 5d, which are the first member to be opposed to the deflector 7 in the main scanning direction, is defined as the "installation area 42". The bottom surface 5f of the housing 5 on which the support members 43 of the optical lenses 60 are arranged is higher than the bottom surface 5f of the housing 5 on which the deflector 7 is installed, that is, the installation area 42, and a wall of a step at the boundary is referred to as a "wall 41". Of members opposed to the deflector 7, the wall 41 is the first member to be opposed to the deflector 7 in the sub-scanning direction. The wall 41 is connected to the walls 41a, which are parallel to the sub-scanning direction, to form the flow path 40a. The same is true for the flow path 40c also.

The high-temperature air generated by the deflector 7 spreads from the drive portion 9 to the surroundings. The high-temperature air generated by the deflector 7 first spreads along an upper surface of the circuit board 8. Thereafter, the high-temperature air spreads to the surroundings while crawling over the bottom surface 5f, specifically, the installation area 42 of the housing 5, and impinges on and is raised by the first wall 41 to be opposed to the deflector 7. In order to allow the high-temperature air flowing in the sub-scanning direction from the deflector 7 to flow in the sub-scanning direction across the first wall 41 standing in the sub-scanning direction to be opposed to the deflector 7, the bottom surface of the installation area 42 in the sub-scanning direction side is connected to the flow path 40.

Figure 3B:
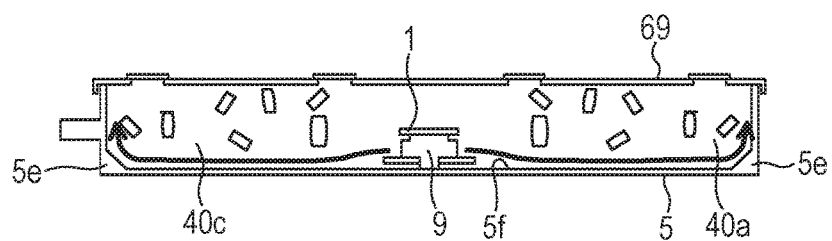
FIG. 3B is a cross-sectional view of the light scanning apparatus according to the first embodiment.

FIG. 3B is a cross-sectional view taken along the line IIIB-IIIB of FIG. 2, and flows of the high-temperature air generated in the deflector 7 are indicated by the thick arrows. For the symbols, main symbols are illustrated. The air that is generated from the deflector 7 and flows in the sub-scanning direction while crawling over the bottom surface of the installation area 42 flows into the flow paths 40 connected to the bottom surface 5f of the installation area 42. The high-temperature air that has flowed into the flow path 40 travels through the flow path 40, which is arranged between the support members at the both ends of the optical element, in a direction separating from the deflector 7 in the sub-scanning direction to reach terminal ends of the flow path 40. Specifically, the air generated by the rotation of the rotary polygon mirror 1 flows to a second space in which the optical lenses 60d and 60f and the reflection mirrors 62e to 62h, which are the plurality of optical elements on the side opposite to the rotary polygon mirror 1 with respect to the optical lens 60c that is the first optical element, are arranged. The air generated by the rotation of the rotary polygon mirror 1 also flows to a third space in which the optical lenses 60b and 60e and the reflection mirrors 62a to 62d, which are a plurality of optical elements on the side opposite to the rotary polygon mirror 1 with respect to the optical lens 60a that is the first optical element, are arranged. The third space is a space opposite to the second space with respect to the rotary polygon mirror 1.

[Terminal Ends of Flow Path]

In the first embodiment, the terminal ends of the flow path 40 are the side wall portions 5e of the housing 5. As illustrated in FIG. 3B, the high-temperature air that has reached the side wall portions 5e, which are the terminal ends of the flow path 40, is raised along the side wall portions 5e of the housing 5, and travels toward the deflector 7 along a lid 69 while spreading in the main scanning direction. The lid 69 is in contact with outside gas, and hence the high-temperature air is cooled in the process of flowing along the lid 69. As described above, the high-temperature air generated by the deflector 7 flows along the circuit board 8, and hence air above the rotary polygon mirror 1 is drawn in by the rotary polygon mirror 1 so as to supplement the air that has flowed out. Therefore, the air that has traveled toward the deflector 7 along the lid 69 is drawn in by the deflector 7 when having flowed to above the deflector 7. The air that has drawn in from above the deflector 7 is heated while circling around the deflector 7, and is spread again from the drive portion 9 to the surroundings.

As a result, the high-temperature air flows inside the support members 43 at the both ends of the optical element of the scanning optical system along the flow path 40, and the temperature inside the support members 43 at the both ends of the optical element is increased. As compared to the case of the related art in which the flow path 40 is not present, the increases in temperature of the side wall portions 5d of the housing 5 and the support portions at the both ends of the optical elements near the side wall portions 5d of the housing 5 become smaller, and the changes in position irradiated with the laser beam becomes smaller.

[Length of Flow Path in Sub-Scanning Direction]

A length of the flow path 40 in the sub-scanning direction is described. When the flow path 40 is short, the high-temperature air flowing through the flow path 40 is raised before passing below the optical lenses 60a and 60c, and impinges on the optical lenses 60a and 60c to return to the deflector 7 directly. As a result, the high-temperature air from the deflector 7 flows in the main scanning direction to impinge on the side wall portions 5d of the housing 5 once, and then flows along the side wall portions 5d to be distributed across the entire housing 5. As a result, portions having a large effect on parts (support portions of the optical elements) causing the changes in position irradiated with the laser beam are disadvantageously increased in temperature.

To address this problem, in the first embodiment, the flow path 40 is longer than a length from the rotary polygon mirror 1 to the support members 43 of each of the optical lenses 60a and 60c in the sub-scanning direction. As a result, the high-temperature air traveling in the sub-scanning direction from the deflector 7 is allowed to flow to pass below the optical lenses 60a and 60c, and the high-temperature flow in the main scanning direction from the deflector 7 can be reduced.

Moreover, there is another problem in that the high-temperature air flowing from the deflector 7 to the surroundings has a strong component in the rotational direction of the rotary polygon mirror 1 with the rotary polygon mirror 1 being the center. The high-temperature air that has entered the flow path 40 flows along the walls 41a of the flow path 40. When a certain amount of the high-temperature air flows along the walls 41a, a component in the main scanning direction of the speed at which the high-temperature air flows is lost, and the high-temperature air does not flow in a large amount in the main scanning direction after exiting the terminal ends of the flow path 40. When the large amount of the high-temperature air flows toward the side wall portions 5d of the housing 5 after exiting the terminal ends of the flow path 40, the side wall portions 5d of the housing 5 and the support members of the optical elements installed in the vicinity of the side wall portions 5d are increased in temperature to cause the changes in position irradiated with the laser beam. To address this problem, the flow path 40 has the length in the sub-scanning direction that is longer than a length (width) of the flow path 40 below the optical lenses 60a and 60c in the main scanning direction. As a result, the large amount of the high-temperature air flowing toward the side wall portions 5d of the housing 5 can be suppressed after the high-temperature air passes through the flow path 40. The terminal ends of the flow path 40 may be between the optical lens 60 and the side wall portions 5e.

[Length (Width) of Flow Path in Main Scanning Direction]

The width of the flow path 40 in the main scanning direction is described. When the support portions at the both ends of the optical elements of the scanning optical system are changed in temperature, the support portions of the reflection mirrors 62 and the optical lenses 60 are locally deformed to change attitude of the reflection mirrors 62 and the optical lenses 60. To address this problem, the length (width) of the flow path 40 in the main scanning direction when the flow path 40 passes below the optical element is set smaller than the distance between the support portions at the both ends of the optical element through which the flow path 40 passes. As illustrated in FIG. 4, a distance between the two support members 43 of the optical lens 60c in the main scanning direction is defined as a distance Aw. The length (width) of the flow path 40a in the main scanning direction is defined as a width Bw. The flow path 40a is formed to have the width Bw that is shorter than the distance Aw (Bw<Aw). With this configuration, the high-temperature air passing through the flow path 40 becomes less likely to impinge on the support portions at the both ends of the optical element, with the result that the local deformation of the support portions of the reflection mirrors 62 and the optical lenses 60 can be suppressed, and hence that the occurrence of the changes in position irradiated with the laser beam can be suppressed. Moreover, as another effect of the flow path 40, the flow path 40 serves as a rib. As a result, bending rigidity of the housing 5 in the main scanning direction is also increased. When the terminal ends of the flow path 40 extend to the side wall portions 5e of the housing 5, in particular, the effect of increasing the rigidity of the housing 5 is particularly significant.

Figure 5:
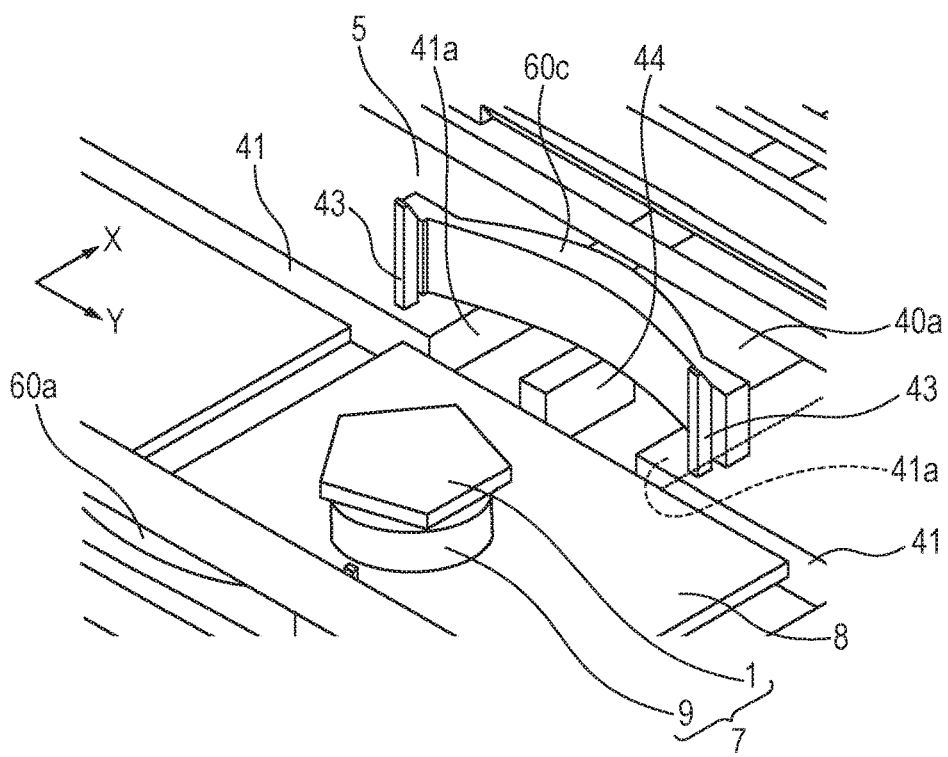
FIG. 5 is a perspective view for illustrating the main part around the rotary polygon mirror in the first embodiment.

As another form of the first embodiment, a case in which the circuit board 8 is connected to the flow path 40 is illustrated in FIG. 5. In this configuration, the high-temperature air generated from the deflector 7 spreads from the drive portion 9 to the surroundings, and spreads along the upper surface of the circuit board 8. The upper surface of the circuit board 8 is connected to the flow path 40 on the sub-scanning direction side. Therefore, the high-temperature air flowing from the deflector 7 to the sub-scanning direction enters the flow path 40 soon. Thereafter, as in the above description, the air flows to the terminal ends of the flow path 40, impinges on the side wall portions 5e of the housing 5 to be raised, and returns to the deflector 7 along the lid 69 while being cooled. As a result, as compared to the related-art example in which the flow path 40 is not present, the increases in temperature of the side wall portions 5d of the housing 5 and the support portions at the both ends of the optical elements that are arranged near the side wall portions 5d of the housing 5 become smaller, and the changes in position irradiated with the laser beam become smaller. As described above, according to the first embodiment, the changes in position irradiated with the laser beam accompanying the heat generation in the deflector can be reduced.

Second Embodiment

[Flow Path]

Figure 6:
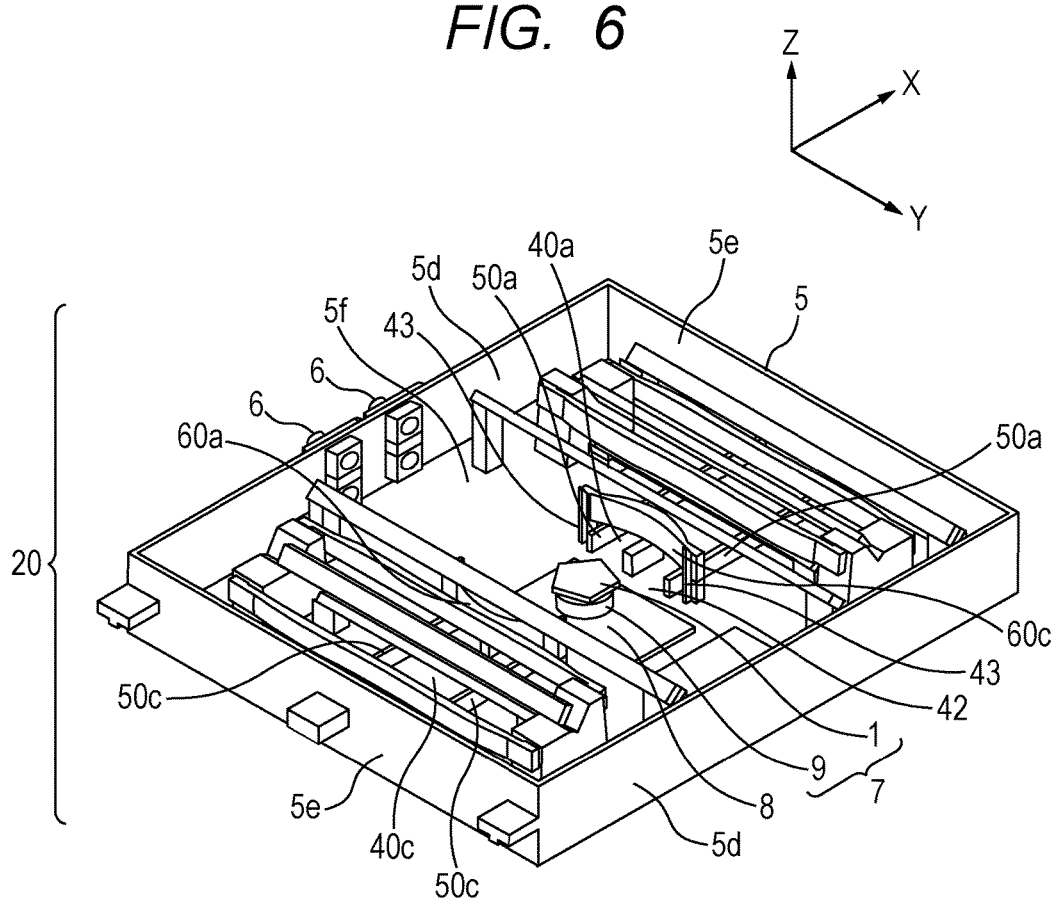
FIG. 6 is a perspective view of a light scanning apparatus according to a second embodiment of the present invention.

A light scanning apparatus 20 according to a second embodiment of the present invention is illustrated in FIG. 6. In the second embodiment, a flow path 40 is formed by two wall portions standing from the bottom surface 5f of the housing 5 in the direction intersecting with the optical element supported by the support portions. Specifically, the flow path 40 (40a, 40c) is formed by ribs 50 arranged on the bottom surface 5f of the housing 5. The ribs 50 specifically include ribs 50a provided on the optical lens 60c side and ribs 50c provided on the optical lens 60a side. The ribs 50a and 50c are hereinafter sometimes also referred to as the "ribs 50".

In the second embodiment, of members opposed to the deflector 7 in the sub-scanning direction, the first members to be opposed to the deflector 7 are the optical lenses 60a and 60c. In this case, the members opposed to the deflector 7 in the sub-scanning direction include the side wall portions 5e of the housing 5, the optical lenses and the reflection mirrors 62, which are the optical elements, and the ribs standing from the bottom surface 5f of the housing 5, for example, and the same is true for the following embodiments. An area of the bottom surface 5f of the housing 5 to the first members (optical lenses 60a and 60c in the second embodiment) to be opposed to the deflector 7 is the installation area 42, and hence the installation area 42 on the sub-scanning direction side ends at the optical lenses 60a and 60c. In order to allow the high-temperature air flowing from the deflector 7 in the sub-scanning direction to flow in the sub-scanning direction across the first members to be opposed to the deflector 7 in the sub-scanning direction, the following configuration is adopted in the second embodiment. Specifically, the bottom surface 5f of the installation area 42 on the sub-scanning direction side is connected to the flow path 40a.

With the above-mentioned configuration, as in the first embodiment, the increases in temperature of the side wall portions 5d of the housing 5 and the support portions at the both ends of the scanning optical system in the vicinity of the side wall portions 5d can be suppressed. As a result, the changes in position irradiated with the laser beam can be suppressed. Also in the second embodiment, as in the first embodiment, the upper surface of the circuit board 8 may be connected to the flow path 40. As described above, according to the second embodiment, the changes in position irradiated with the laser beam accompanying the heat generation in the deflector can be reduced.

Third Embodiment

[Blocking Plate]

Figure 7:
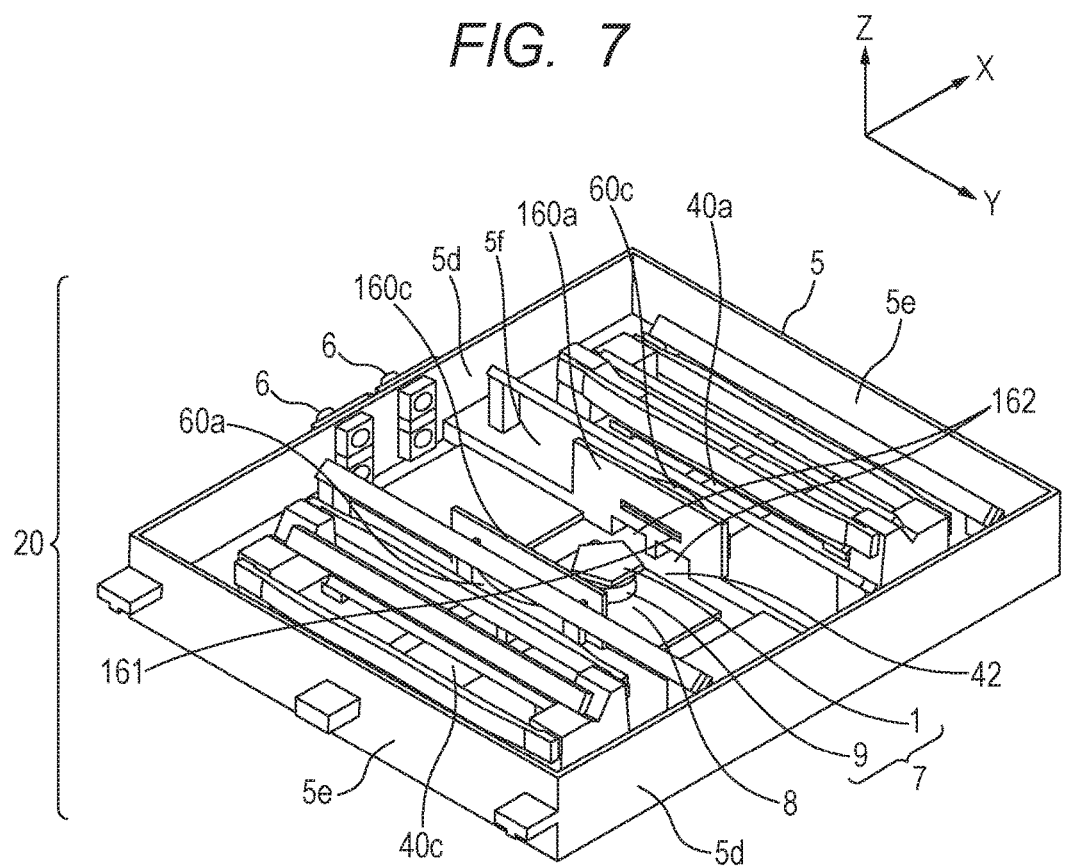
FIG. 7 is a perspective view of a light scanning apparatus according to a third embodiment of the present invention.

FIG. 7 is a view for illustrating a light scanning apparatus 20 according to a third embodiment of the present invention. In the third embodiment, blocking plates 160a and 160c having a first opening 161 for restricting a range of scanning light from the rotary polygon mirror 1 are arranged between the deflector 7 and the optical lenses 60a and 60c. The blocking plate 160a is provided between the deflector 7 and the optical lens 60c, and the blocking plate 160c is provided between the deflector 7 and the optical lens 60a. The blocking plates 160a and 160c are hereinafter sometimes referred to as the "blocking plates 160". Therefore, in the third embodiment, the members opposed to the deflector 7 in the sub-scanning direction include the blocking plates 160. In the third embodiment, the first members to be opposed to the deflector 7 in the sub-scanning direction are the blocking plates 160. The area to the first members (blocking plate 160) to be opposed to the deflector 7 is the installation area 42, and hence in the third embodiment, the installation area 42 on the sub-scanning direction side ends at the blocking plates 160. In order to allow the high-temperature air flowing from the deflector 7 in the sub-scanning direction to flow in the sub-scanning direction across the first members (blocking plates 160) to be opposed to the deflector 7 in the sub-scanning direction, the following configuration is adopted in the third embodiment. Specifically, the bottom surface 5f of the installation area 42 on the sub-scanning direction side is connected to the flow path 40a. At this time, the blocking plate 160 has a second opening 162 connected to the flow path 40 so that the blocking plate 160 does not block the flow path 40.

With the above-mentioned configuration, as in the first embodiment, the increases in temperature of the side wall portions 5d of the housing 5 and the support portions at the both ends of the scanning optical system in the vicinity of the side wall portions 5d can be suppressed. As a result, the changes in position irradiated with the laser beam can be suppressed. Also in the third embodiment, as in the first embodiment, the circuit board 8 may be connected to the flow path 40. Moreover, with the formation of the flow path 40, the flow path 40 serves as a rib such that rigidity in the main scanning direction is increased, but rigidity in the sub-scanning direction is somewhat reduced. To address this problem, the blocking plate 160 integrally molded with the housing 5 is arranged to intersect with the flow path 40 such that the blocking plate 160 serves as a rib, and the reduction in rigidity of the housing 5 in the sub-scanning direction can be suppressed. As described above, according to the third embodiment, the changes in position irradiated with the laser beam accompanying the heat generation in the deflector can be reduced.

Fourth Embodiment

[Raising Member]

Figure 8A:
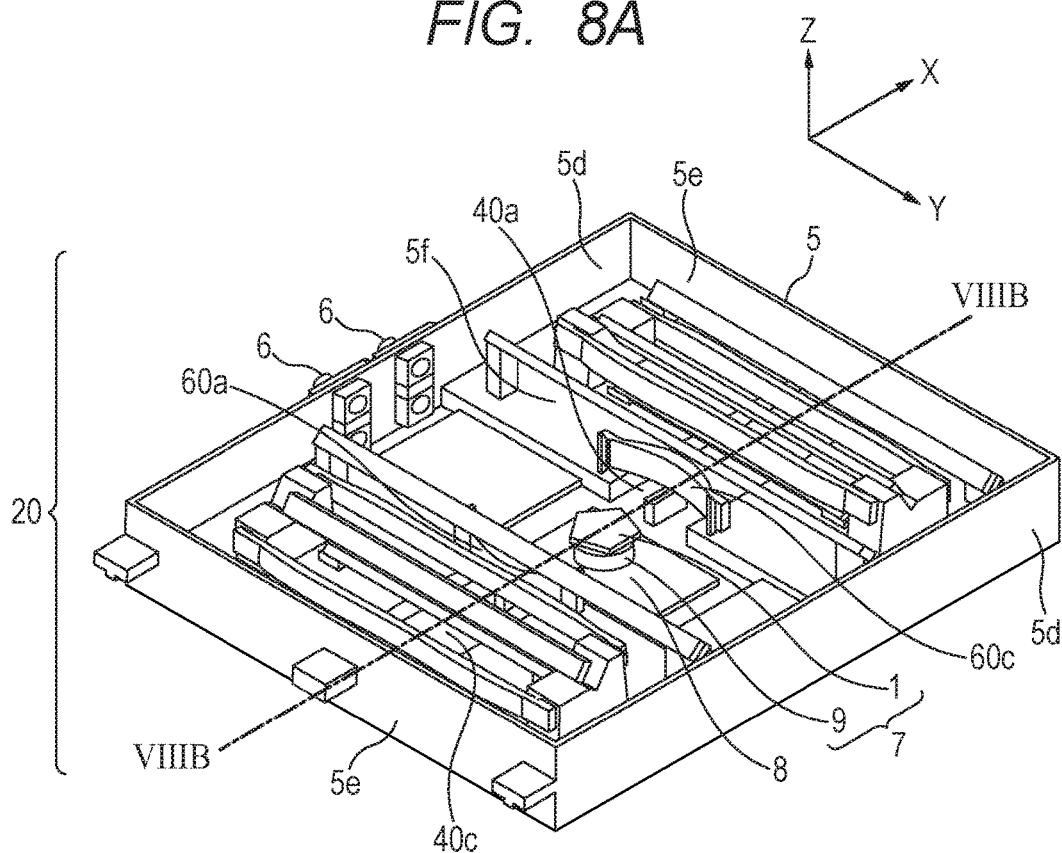
FIG. 8A is a perspective view of a light scanning apparatus according to a fourth embodiment of the present invention.

FIG. 8A is a view for illustrating a light scanning apparatus 20 according to a fourth embodiment of the present invention. In the fourth embodiment, there is adopted a configuration in which raising members 70a and 70b (see FIG. 8B) are arranged in the course of the flow path 40 in the first embodiment. The raising members 70a and 70b are hereinafter sometimes referred to as the "raising members 70". The raising member 70 is a member configured to guide air that has flowed into the flow path 40 between the optical lens 60 and the reflection mirror 62 in a direction above the bottom surface 5f of the housing 5.

Figure 8B:
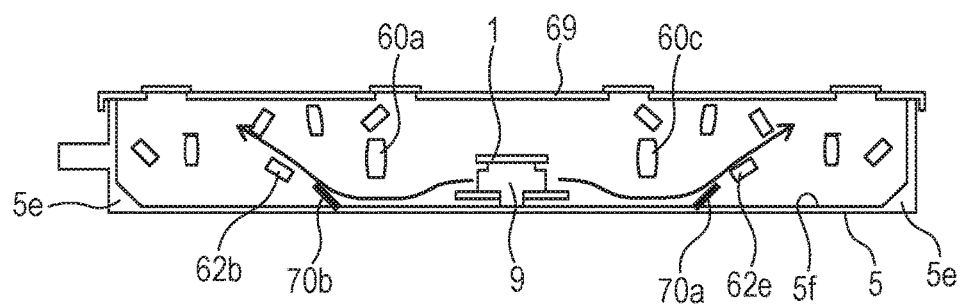
FIG. 8B is a cross-sectional view taken along the line VIIIB-VIIIB of FIG. 8A.

The raising members 70a and 70b are arranged in the flow paths 40 between the optical lenses 60a and 60c and the reflection mirrors 62b and 62e (see FIG. 8A) on which the laser beams that have passed through the optical lenses 60a and 60c are incident, respectively. More specifically, the raising member 70a is provided between the optical lens 60c and the reflection mirror 62e on which the laser beam that has passed through the optical lens 60c is incident. The raising member 70b is provided between the optical lens 60a and the reflection mirror 62b on which the laser beam that has passed through the optical lens 60a is incident. In this case, the high-temperature air that has flowed into the flow path 40 from the deflector 7 is raised upward by the raising member 70, then passes through the scanning optical system to reach the lid 69, and returns to the deflector 7 while being cooled by the lid 69. FIG. 8B is a cross-sectional view taken along the line VIIIB-VIIIB of FIG. 8A, and flows of the high-temperature air generated in the deflector 7 are indicated by the thick arrows.

As a result, an area in which the high-temperature air from the deflector 7 is brought into contact with the housing 5 can be reduced, and the deformation of the housing 5 can be reduced. As a result, the change in position irradiated with laser can be reduced. In the fourth embodiment, the raising members 70 are provided between the optical lenses 60a and 60c and the reflection mirrors 62b and 62e. However, it is only required that the raising members 70 be provided at positions farther away from the deflector 7 in the sub-scanning direction than at least the optical lenses 60a and 60c. In other words, it is only required that the raising members 70 be provided between, of the plurality of optical elements, the first optical elements on which the laser beams deflected by the rotary polygon mirror 1 is incident, and, of the plurality of side wall portions, the side wall portions that are substantially parallel to the longitudinal direction of the optical elements. As described above, according to the fourth embodiment, the changes in position irradiated with the laser beam accompanying the heat generation in the deflector can be reduced.

Fifth Embodiment

[Rib]

Figure 9:
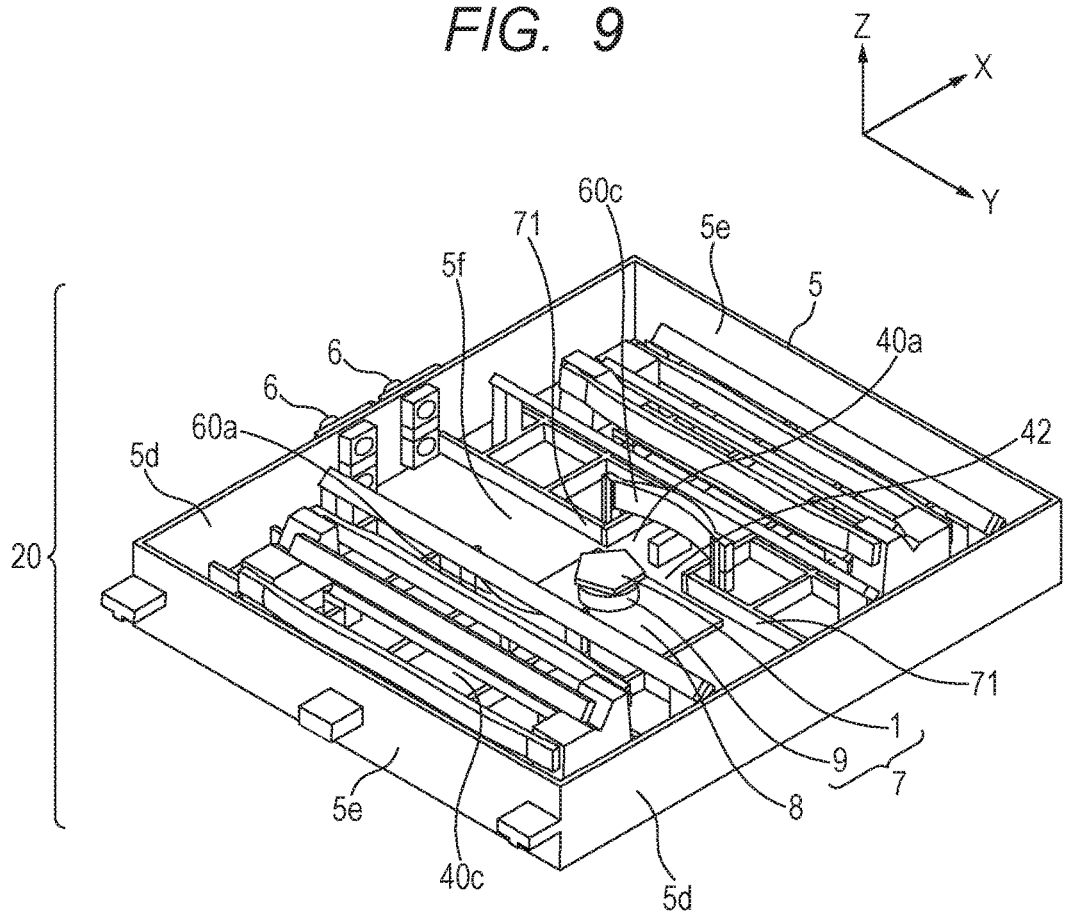
FIG. 9 is a perspective view of a light scanning apparatus according to a fifth embodiment of the present invention.

FIG. 9 is a view for illustrating a light scanning apparatus 20 according to a fifth embodiment of the present invention. In the fifth embodiment, a rib 71 is arranged on the bottom surface 5f of the housing 5. Although not seen in FIG. 9, a rib similar to the rib 71 is provided also on the optical lens 60a side. The rib 71 is arranged in a direction parallel to the main scanning direction. The first member to be opposed to the deflector 7 in the sub-scanning direction in the fifth embodiment is the rib 71. The area to the first member (rib 71) to be opposed to the deflector 7 is the installation area 42, and hence the area on the sub-scanning direction side of the installation area 42 ends at the rib 71. In order to allow the high-temperature air flowing from the deflector 7 in the sub-scanning direction to flow in the sub-scanning direction across the first member to be opposed to the deflector 7, the following configuration is adopted. Specifically, in the fifth embodiment, the bottom surface 5f of the installation area 42 on the sub-scanning direction side is connected to the flow path 40a. The same is true for the flow path 40c also.

With the above-mentioned configuration, as in the first embodiment, the increases in temperature of the side wall portions 5d of the housing 5 and the support portions at the both ends of the scanning optical system in the vicinity of the side wall portions 5d can be suppressed. As a result, the changes in position irradiated with the laser beam can be suppressed. Also in the fifth embodiment, as in the first embodiment, the upper surface of the circuit board 8 may be connected to the flow path 40. As described above, according to the fifth embodiment, the changes in position irradiated with the laser beam accompanying the heat generation in the deflector can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025993, filed Feb. 15, 2017, which is hereby incorporated by reference herein in its entirety.

What is claimed is:

1. A light scanning apparatus, comprising:
a light source configured to emit a laser beam;
a rotary polygon mirror configured to deflect the laser beam emitted from the light source;
a plurality of optical elements configured to guide, to a photosensitive member, the laser beam deflected by the rotary polygon mirror;
a housing having a bottom portion and a plurality of side wall portions standing from the bottom portion, the light source being mounted on a side wall portion, of the plurality of side wall portions, intersecting with a longitudinal direction of the plurality of optical elements, the rotary polygon mirror being mounted on the bottom portion; and
a plurality of wall portions provided on the bottom portion so as to intersect with the longitudinal direction between the bottom portion and a lens, of the plurality of optical elements, that is closest to the rotary polygon mirror on an optical path of the laser beam deflected by the rotary polygon mirror, the plurality of wall portions forming an air flow path for guiding an air flow caused by rotation of the rotary polygon mirror from a first space in which the rotary polygon mirror is arranged to a second space that is opposite to the first space with respect to the lens.

2. A light scanning apparatus according to claim 1, wherein the air flow path extends from the first space to the second space through between the bottom portion and the lens.

3. A light scanning apparatus according to claim 1, further comprising:
two support portions formed integrally with the housing and configured to support one end and the other end of the lens; and
a groove portion provided in the bottom portion so as to extend in a direction intersecting with the lens supported by the two support portions,
wherein both side walls of the groove portion in the longitudinal direction forms two wall portions of the plurality of wall portions, and
wherein the air flow path is formed of a bottom portion of the groove portion and the two wall portions.

4. A light scanning apparatus according to claim 1, further comprising two support portions formed integrally with the housing and configured to support one end and the other end of the lens,
wherein the plurality of wall portions include two wall portions that are standing from the bottom portion so as to extend in a direction intersecting with the lens supported by the two support portions, and
wherein the air flow path is formed of the bottom portion of the housing and the two wall portions.

5. A light scanning apparatus according to claim 1, further comprising a plurality of other wall portions provided on the bottom portion so as to intersect with the longitudinal direction between the bottom portion and an other lens that is provided on a side opposite to the lens with respect to the rotary polygon mirror, the plurality of other wall portions forming an other air flow path for guiding an air flow caused by the rotation of the rotary polygon mirror from the first space in which the rotary polygon mirror is arranged to a third space that is opposite to the first space with respect to the other lens.

6. A light scanning apparatus according to claim 1, wherein the air flow path extends to between the lens and a side wall portion, of the plurality of side wall portions, that is substantially parallel to the longitudinal direction.

7. A light scanning apparatus according to claim 1, wherein a length of the air flow path in a direction intersecting with the longitudinal direction is longer than a length of the air flow path in the longitudinal direction.

8. A light scanning apparatus according to claim 1, wherein the air flow path extends to reach a side wall portion, of the plurality of side wall portions, that is substantially parallel to the longitudinal direction.

9. A light scanning apparatus according to claim 1, further comprising:
a drive portion configured to drive the rotary polygon mirror; and
a circuit board on which the rotary polygon mirror and the drive portion are mounted,
wherein the circuit board is in contact with the air flow path in a direction intersecting with the longitudinal direction.

10. A light scanning apparatus according to claim 3, wherein a distance between the two wall portions is smaller than a distance between the two support portions.

11. A light scanning apparatus according to claim 1, further comprising a blocking plate arranged between the rotary polygon mirror and the lens and configured to restrict a range scanned with the laser beam deflected by the rotary polygon mirror,
wherein the blocking plate has a first opening through which the laser beam deflected by the rotary polygon mirror enters the lens and a second opening communicating with the air flow path.

12. A light scanning apparatus according to claim 1, further comprising a member arranged between the lens and a side wall portion, of the plurality of side wall portions, that is substantially parallel to the longitudinal direction, and configured to guide the air flow introduced into the air flow path to a direction above the bottom portion.

13. A light scanning apparatus, comprising:
a light source configured to emit a laser beam;
a rotary polygon mirror configured to deflect the laser beam emitted from the light source;
a plurality of optical elements configured to guide, to a photosensitive member, the laser beam deflected by the rotary polygon mirror, the plurality of optical elements including a lens, of the plurality of optical elements, that is closest to the rotary polygon mirror on an optical path of the laser beam deflected by the rotary polygon mirror; and
a housing configured to house the rotary polygon mirror and the plurality of optical elements, the housing including a bottom portion configured to support the rotary polygon mirror and the lens;
a plurality of support portions formed on the bottom portion and configured to support both ends of the lens in a longitudinal direction of the lens, respectively; and
a groove portion formed in the bottom portion and extending from just below the lens to a second space so that a first space in which the rotary polygon mirror is arranged is communicated with the second space which is opposite to the first space with respect to the lens.

14. A light scanning apparatus according to claim 13, wherein an other optical element than the lens of the plurality of optical elements is housed in the housing so as to be located in the second space, the groove portion extending below the other optical element than the lens.

15. A light scanning apparatus according to claim 13, further comprising an other support portion configured to support the lens between the plurality of support portions in the longitudinal direction, the other support portion being formed on the groove portion.

16. A light scanning apparatus comprising:
a first light source configured to emit a first laser beam;
a second light source configured to emit a second laser beam;
a rotary polygon mirror configured to deflect the first laser beam and the second light beam, the first laser beam and the second light beam being deflected to opposite sides across the rotary polygon mirror, respectively;
a first plurality of optical elements configured to guide, to a first photosensitive member, the first laser beam deflected by the rotary polygon mirror, the first plurality of optical elements including a first lens, of the first plurality of optical elements, that is closest to the rotary polygon mirror on an optical path of the first laser beam deflected by the rotary polygon mirror;

a second plurality of optical elements configured to guide, to a second photosensitive member, the second laser beam deflected by the rotary polygon mirror, the second plurality of optical elements including a second lens, of the second plurality of optical elements, that is closest to the rotary polygon mirror on an optical path of the second laser beam deflected by the rotary polygon mirror;

a housing configured to house the rotary polygon mirror, the first plurality of optical elements, and the second plurality of optical elements, the housing including a bottom portion configured to support the rotary polygon mirror, the first lens, and the second lens;

a first support portion formed on the bottom portion and configured to support both ends of the first lens in a longitudinal direction of the first lens, respectively;

a first groove portion formed in the bottom portion and extending from just below the first lens to a second space so that a first space in which the rotary polygon mirror is arranged is communicated with the second space which is opposite to the first space with respect to the first lens;

a second support portion formed on the bottom portion and configured to support both ends of the second lens in a longitudinal direction of the second lens, respectively; and a second groove portion formed in the bottom portion and extending from just below the second lens to a fourth space so that a third space in which the rotary polygon mirror is arranged is communicated with the fourth space which is opposite to the third space with respect to the second lens.

17. A light scanning apparatus according to claim 16, further comprising a third support portion arranged between a plurality of support portions at which the first support portion supports the first lens in the longitudinal direction so as to support the first lens, the third support portion being formed on the first groove portion.

18. A light scanning apparatus according to claim 17, further comprising a fourth support portion arranged between a plurality of support portions at which the second support portion supports the second lens in the longitudinal direction so as to support the second lens, the fourth support portion being formed on the second groove portion.

19. A light scanning apparatus according to claim 16, wherein an other optical element than the first lens of the first plurality of optical elements is housed in the housing so as to be located in the second space, the first groove portion extending just below the other optical element than the first lens.

20. A light scanning apparatus according to claim 19, wherein an other optical element than the second lens of the second plurality of optical elements is housed in the housing so as to be located in the fourth space, the second groove portion extending just below the other optical element than the second lens.

* * * * *